(12) United States Patent
Uhrner

(10) Patent No.: US 7,134,669 B2
(45) Date of Patent: Nov. 14, 2006

(54) SEALING RING

(75) Inventor: Klaus-Jürgen Uhrner, Leingarten (DE)

(73) Assignee: KACO GmbH & Co., Heilbronn (DE)

( * ) Notice: Subject to any disclaimer, the term of this patent is extended or adjusted under 35 U.S.C. 154(b) by 119 days.

(21) Appl. No.: 10/605,954

(22) Filed: Nov. 10, 2003

(65) Prior Publication Data
US 2004/0160014 A1    Aug. 19, 2004

(30) Foreign Application Priority Data
Nov. 11, 2002  (DE) .................................. 102 53 885

(51) Int. Cl.
*F16J 15/32*    (2006.01)
(52) U.S. Cl. ....................... 277/551; 277/556; 277/572; 277/575
(58) Field of Classification Search ........ 277/549–556, 277/572–577, 370, 375, 435, 432, 511
See application file for complete search history.

(56) References Cited

U.S. PATENT DOCUMENTS

| | | | | |
|---|---|---|---|---|
| 2,480,116 A | * | 8/1949 | Brummer ..................... 277/553 |
| 4,226,428 A | * | 10/1980 | Paptzun ....................... 277/552 |
| 4,739,998 A | * | 4/1988 | Steusloff et al. ............. 277/309 |
| 5,198,053 A | * | 3/1993 | Duncan ........................ 156/64 |
| 5,209,502 A | * | 5/1993 | Savoia ......................... 277/562 |
| 6,779,798 B1 | * | 8/2004 | Fougerolle ................... 277/320 |
| 6,945,536 B1 | * | 9/2005 | Iwakata et al. .............. 277/552 |

* cited by examiner

Primary Examiner—Michael Trettel
(74) Attorney, Agent, or Firm—Gudrun E. Huckett

(57) ABSTRACT

A sealing ring has an annular disk with at least one fastening part secured on a first machine part and at least one sealing part that, when the sealing ring is mounted, sealingly rests against a second machine part. The annular disk is fastened without intermediate positioning of a supporting body on the first machine part. The sealing ring is a rotary shaft seal, a piston seal ring, or a rod seal. One of the first and second machine parts is stationary and the other one of first and second machine parts is moveable. A first bonding layer is attached to the annular disk, and the annular disk is connected with the first bonding layer to the first machine part. The first bonding layer is an adhesive layer.

41 Claims, 11 Drawing Sheets

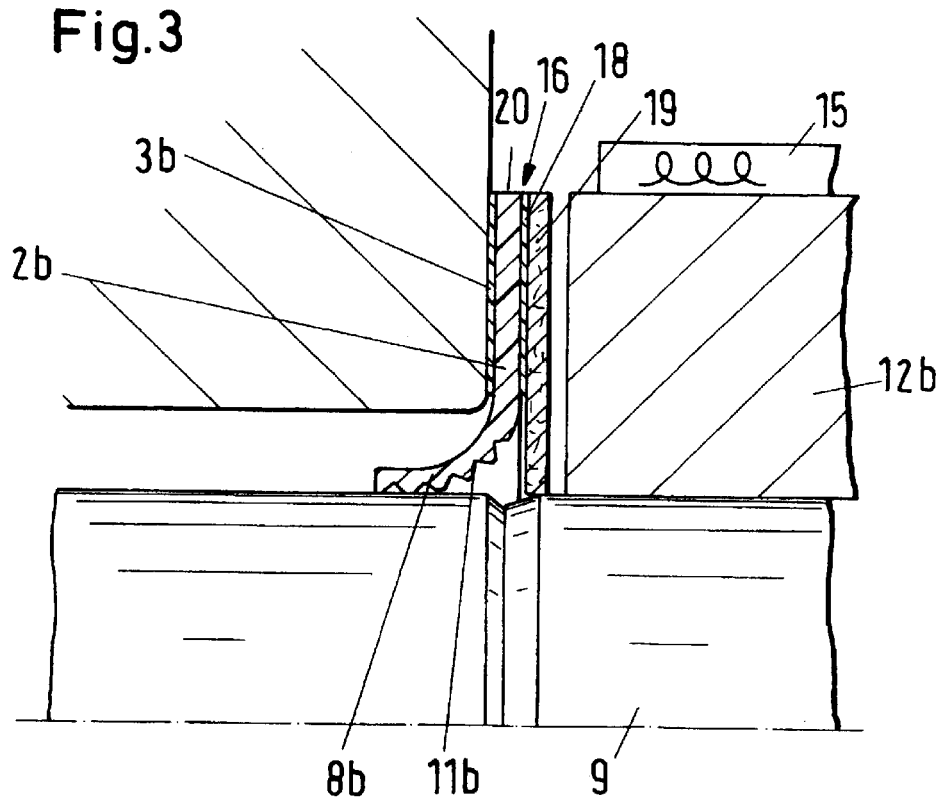
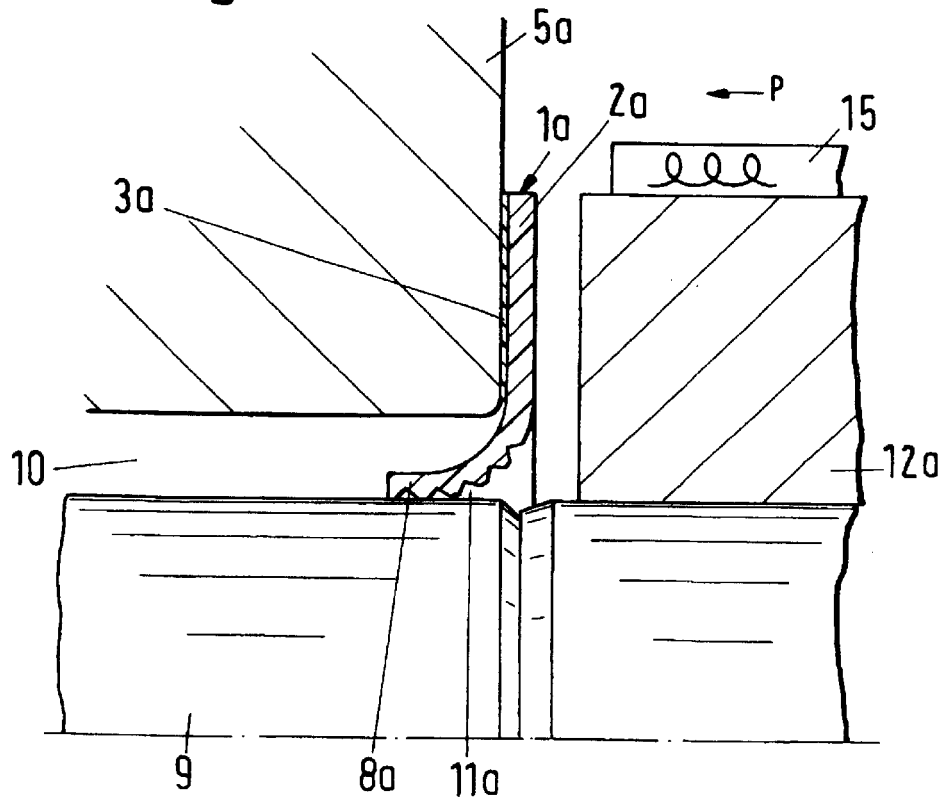

Fig. 8
Fig. 9
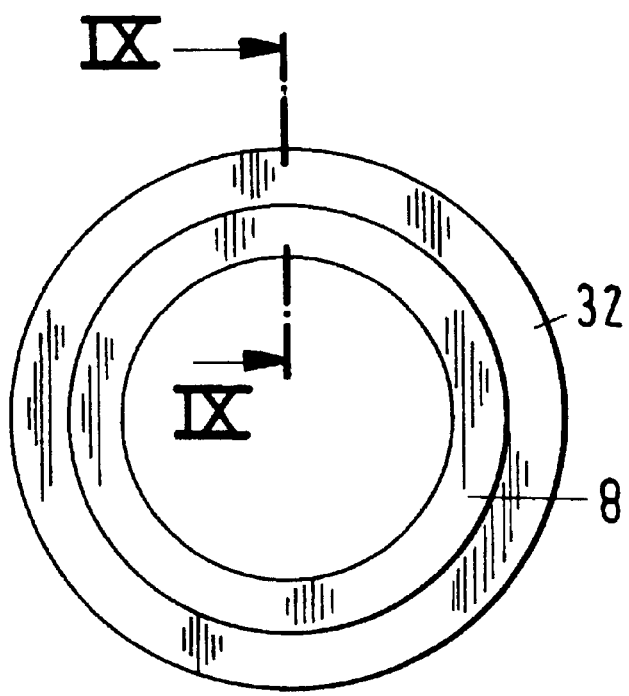
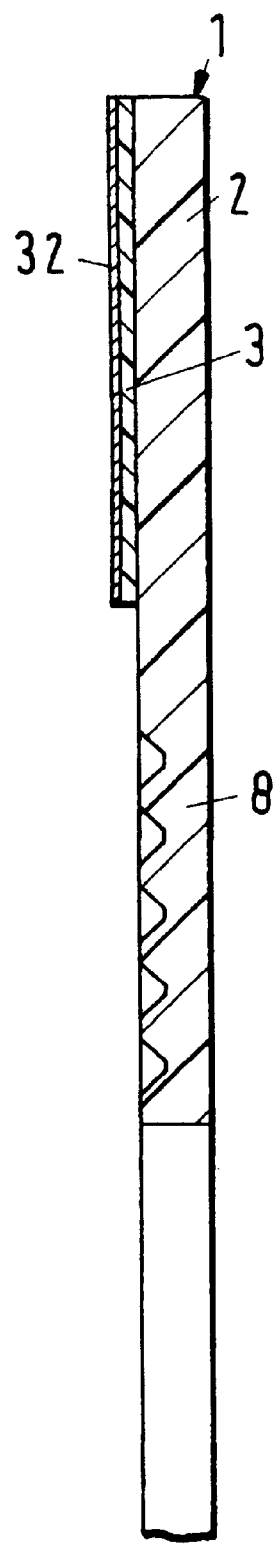

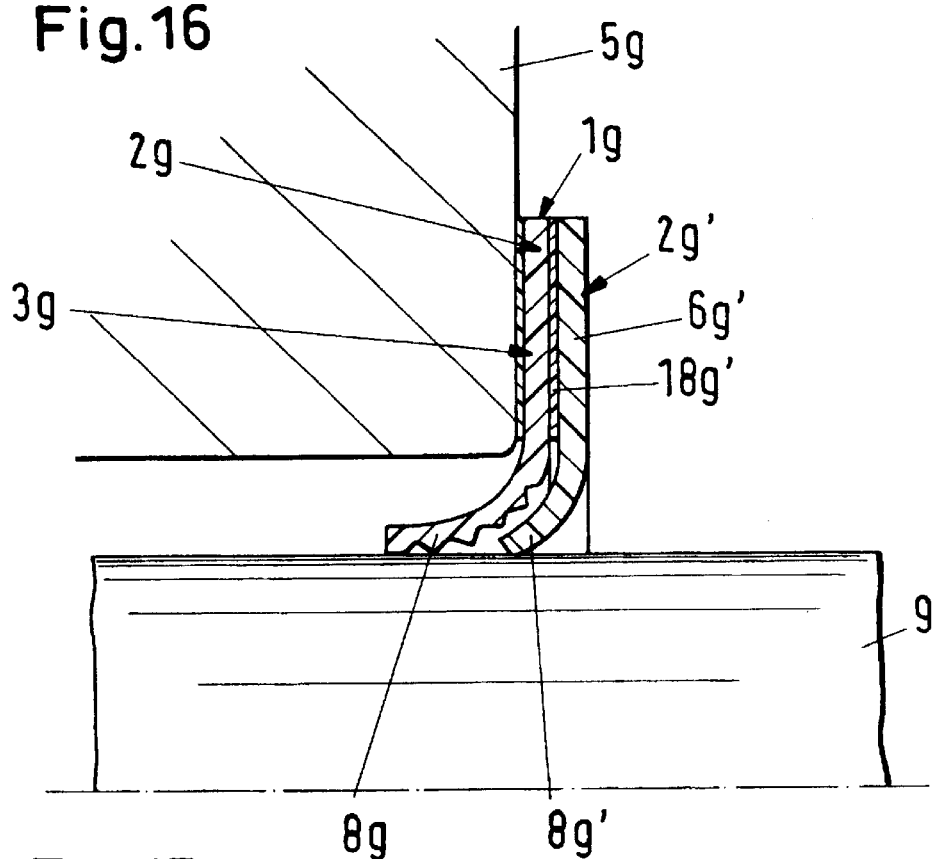
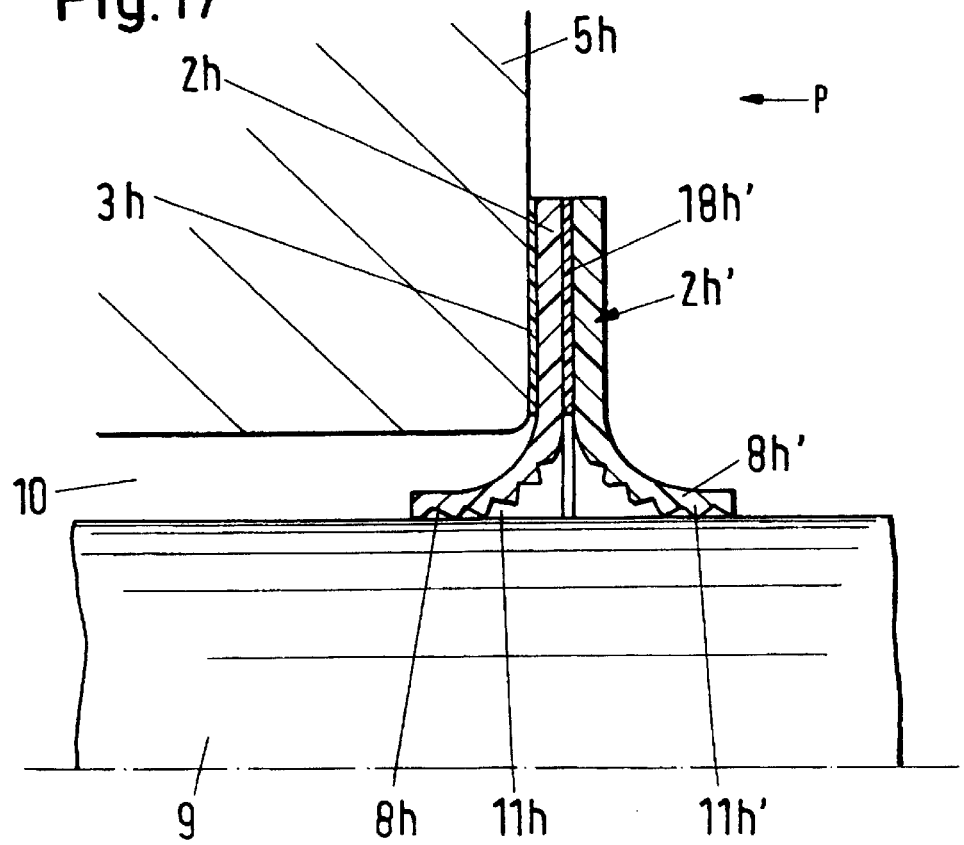

SEALING RING

BACKGROUND OF INVENTION

1. Field of the Invention

The invention relates to a sealing ring, in particular, a rotary shaft seal, a piston seal ring, or a rod seal. The sealing ring comprises at least one fastening part secured on a first, preferably stationary, machine part and at least one sealing part which, when the sealing ring is mounted, sealingly rests against a second, preferably movable, machine part.

2. Description of the Related Art

Rotary shaft seals are known that have a cup-shaped annular body provided at least on its outer peripheral surface at least partially with a coating or sheath that is comprised of elastic material. The coating forms a static sealing part that rests in the mounted position sealingly on the wall of the mounting space. The dynamic sealing part is formed of an annular disk made of polytetrafluoroethylene that must be attached to the support body. The sealing ring is complex in its configuration and expensive in its manufacture. In order to obtain a proper static sealing action, the wall of the mounting space must be machined very precisely.

SUMMARY OF INVENTION

It is an object of the present invention to configure a sealing ring of this kind such that it can be mounted easily and has a constructively simple configuration.

In accordance with the present invention, this is achieved in that the fastening part and the sealing part are components of an annular disk which can be fastened without intermediate positioning of a carrying or supporting body on the machine part.

The sealing ring according to the invention is mounted without a carrying or supporting body at the mounting location. Generally, the sealing ring is fastened on the stationary machine part, for example, a housing. However, it is also possible to fasten the sealing ring on the movable machine part. Since a support or carrying body is not present, the annular disk is held directly on the machine part. The sealing ring according to the invention can be manufactured and mounted very simply and inexpensively in this way. Since a coating or a sheath must not be provided on the carrying or support body, the expensive vulcanization devices required for this purpose are no longer needed. The fastening surface on the machine part must not be machined precisely or can be left unmachined; this contributes to an inexpensive mounting of the sealing ring.

Advantageously, the annular disk is fastened by means of an adhesive layer on the machine part. This adhesive layer can be configured such that, for obtaining the adhesive action, it must only be heated while the sealing ring is pressed against the fastening surface.

Advantageously, the adhesive layer is configured such that upon renewed heating the adhesive force is reduced such that the sealing ring can be removed from the machine part.

The annular disk is, in particular, a polyfluorocarbon disk, preferably, a polytetrafluoroethylene disk. It can be subjected to a plasma treatment, at least in the area with which it is fastened on the machine part, such that this fastening area has a surface roughness within the micro range. The plasma treatment as a result of plasma etching provides a sandblasting effect and/or chemical changes in the micro range of the surface. This plasma-activated range or area ensures that the annular disk can be reliably and securely connected to the machine part without this requiring the otherwise necessary etching processes by means of solutions. The plasma-treated area of the annular disk can be connected directly to the machine part, i.e., without any intermediate layer comprised of a bonding agent having to be provided. Of course, it is possible to employ such an intermediate layer, if desired.

BRIEF DESCRIPTION OF DRAWINGS

FIG. 2 shows a second embodiment of a sealing ring according to the invention in an illustration according to FIG. 1.

FIG. 3 shows a third embodiment of a sealing ring according to the invention in an illustration according to FIG. 1.

FIG. 8 is an end view of a seventh embodiment of a sealing ring according to FIG. 9 before being mounted.

FIG. 9 is a section view along the line IX—IX our FIG. 8 in an enlarged illustration.

FIG. 16 shows an eighth embodiment of a sealing ring according to the invention in an illustration according to FIG. 1.

FIG. 17 shows a ninth embodiment of a sealing ring according to the invention in an illustration according to FIG. 1.

DETAILED DESCRIPTION

Figure 1:
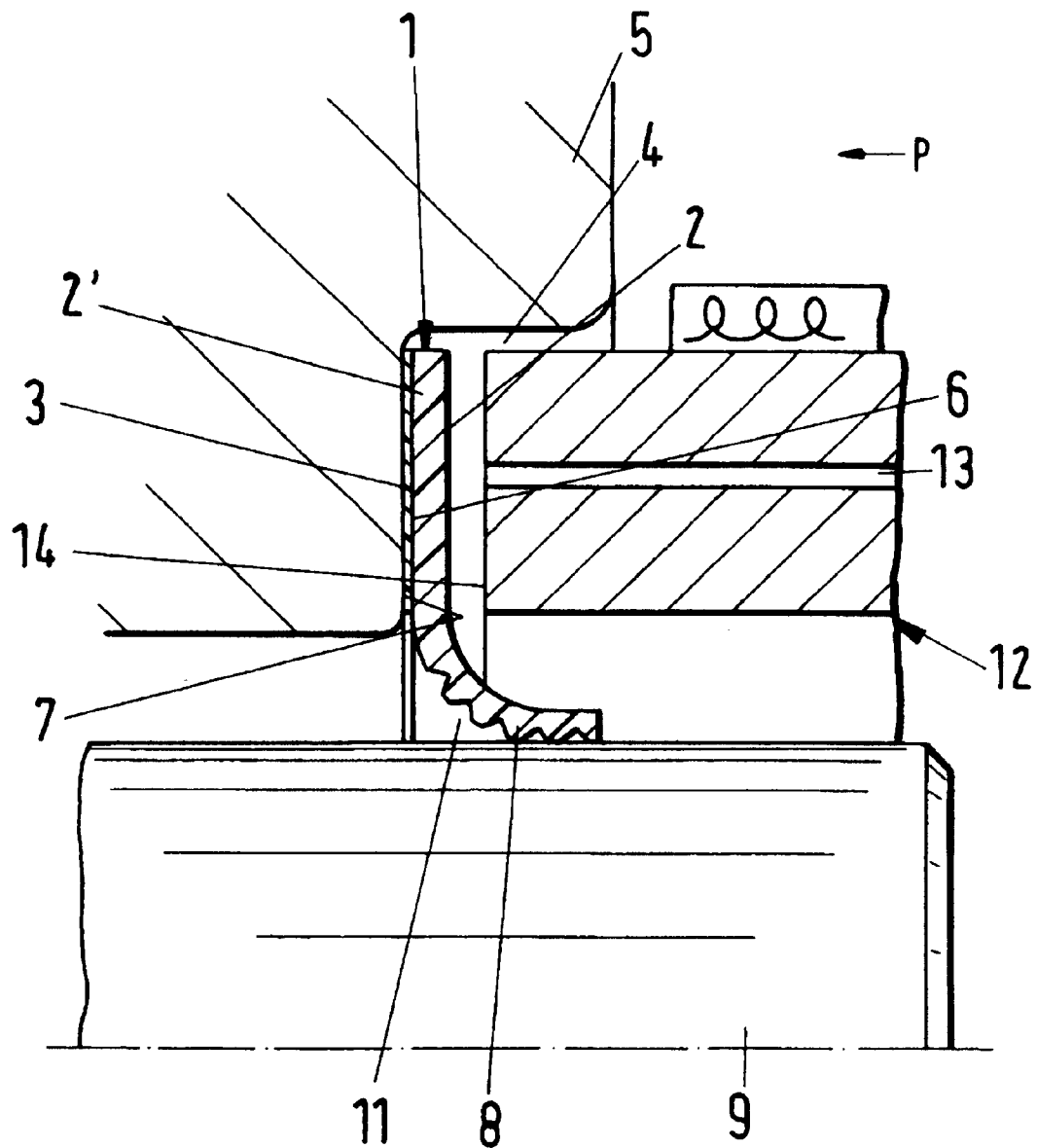
FIG. 1 shows in axial section one half of a first embodiment of a sealing ring according to the invention.
Figure 12:
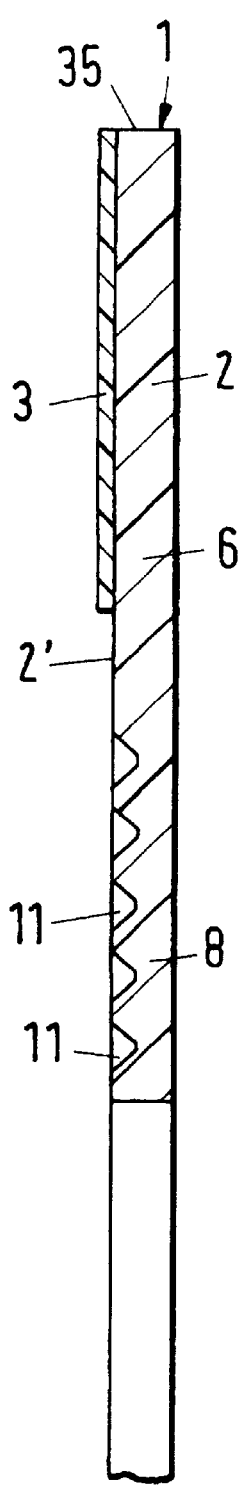
FIG. 12 shows in an illustration corresponding to FIG. 9 the embodiment of a sealing ring according to FIG. 1.

The rotary shaft seal 1 illustrated in FIGS. 1 and 12 is formed by an annular disk 2 (FIG. 12) that has on one side 2' an adhesive layer 3 with which it is fastened on the end face recess 4 of a machine housing 5 (not illustrated in detail). The annular disk 2 is comprised preferably of polyfluorocarbon, in particular, polytetrafluoroethylene. Of course, it can also be made of any other suitable material, for example, elastomer-modified polytetrafluoroethylene or an elastomer or a similar material. The annular disk 2 has a radial outer annular section forming a fastening part 6 for connecting the annular disk 2 to the housing 5. As illustrated in FIG. 1, the annular disk 2 is attached by means of the adhesive layer 3 directly to a bottom 7 of the recess 4.

The radial inner annular section of the annular disk 2 forms a sealing part 8 with which the annular disk 2 rests sealingly on a shaft 9 to be sealed. The shaft penetrates through a central opening 10 of the housing 5. The sealing part 8 has a slightly smaller radial width than the fastening part 6. The sealing part 8 has on the side 2' facing the medium (in the following: the medium side) a spirally extending annular groove 11. It forms, as is known in the art, a returning device for conveying away the medium to be sealed. In the illustrated embodiment of FIG. 1, the sealing part 8 is curved in a direction toward the side facing the air (in the following: the air side).

For mounting, the annular disk 2 is inserted by means of a mounting tool 12 (FIG. 1) in the mounting direction P into the recess 4 of the housing 5 until the annular disk 2 with its adhesive layer 3 rests against the bottom 7 of the recess 4. For securing the annular disk 2, the tool 12 is connected to a vacuum device (not illustrated) and has at least one, preferably several, supply lines 13 opening into the planar end face 14 of the tool; by means of the supply lines, a suction force is exerted onto the annular disk 2. By means of the vacuum device the annular disk 2 is sucked against the tool and secured in this way on the tool such that it can be inserted together with the tool into the housing 5 in the direction P. The end face 14 of the mounting tool 12 has radially such a width that the annular disk 2 with its fastening part 6 securely rests against the end face 14.

Moreover, the tool 12 has a heating device 15 with which the adhesive layer 3 can be heated and/or melted in order to attach the annular disk 2 to the bottom 7 of the recess 4. During the heating process, the adhesive layer 3 is pressed by means of the mounting tool 12 with sufficient pressure against the bottom 7. As soon as the adhesive layer 3 has hardened after switching off the heating device 15, the vacuum device is switched off so that the mounting tool 12 can be retracted. Since the end face 14 of the mounting tool 12 extends about the circumference of the adhesive layer 3, the layer is pressed against the bottom 7.

In this way, it is ensured that the sealing ring 1 is securely fastened on the bottom 7. The adhesive layer 3 extends to the outer edge 35 of the sealing ring 1 (FIG. 12) and across at least half the radial with of the fastening part 6. Since the sealing ring 1 is fastened directly on the bottom 7, the sealing ring has a constructively simple configuration. For example, additional fastening parts such as support members are not required. The sealing ring 1 can therefore also be manufactured very inexpensively. In particular, the bottom 7 of the recess 4 that provides the mounting space must not be machined precisely because the adhesive layer 3 will compensate possibly present roughness of the bottom 7. The housing 5 can be cast, must not be machined or needs to be machined only coarsely. Since no narrow manufacturing tolerances are required at the corresponding housing surface, the housing 5 can be manufactured inexpensively. As a result of the simple, direct attachment of the sealing ring 1 on the housing 5, mounting can be carried out in a simple way with minimal expenditure.

When the sealing ring 1 is to be removed from the housing, this can also be realized by means of the tool 12. With the heating device 15, the adhesive layer 3 is heated. When the adhesive layer has been melted, the sealing ring 1 can be removed by means of the tool whose vacuum device is switched on.

Figure 10:
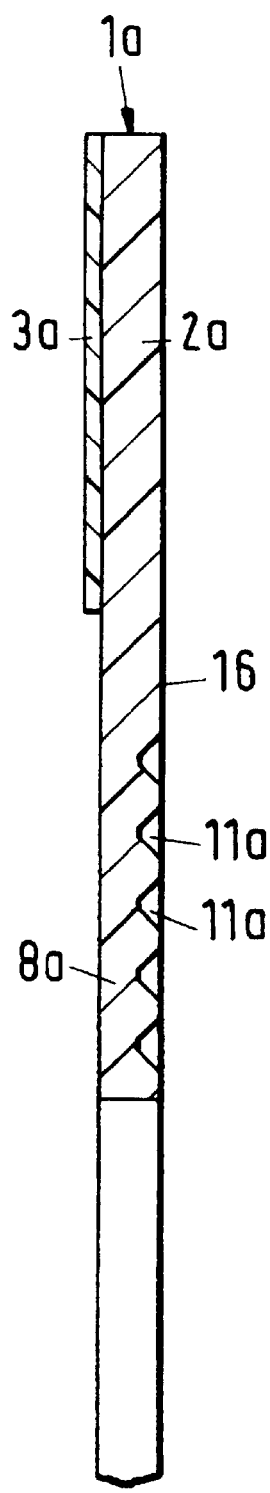
FIG. 10 shows in an illustration corresponding to FIG. 9 the embodiment of a sealing ring according to FIG. 3.

The sealing ring 1*a* illustrated in FIGS. 2 and 10 differs from the afore described sealing ring 1 in that the sealing part 8*a* is bent in the direction towards the medium side.

The returning device 11*a* is provided on the air side 16 of the sealing part 8*a* projecting into the housing opening 10 of the housing 5*a*.

The sealing ring 1*a* is fastened with its fastening part 6*a* by means of the adhesive layer 3*a* on a plane end face 17 of the housing 5*a*. By means of the mounting tool 12*a*, the annular disk 2*a* is pressed with the adhesive layer 3*a* against the housing end face 17 and, by means of the heating device 15, the adhesive layer 3*a* is melted in the afore described way. After hardening of the adhesive layer 3*a* and removal of the tool, the sealing ring 1*a* is fastened securely on the end face of the housing 17 that is positioned radially relative to the shaft 9 to be sealed. The tool 12*a*, in contrast to the tool 12 of FIG. 1, has no suction device so that there are also no supply lines 13.

The sealing ring 1*a* can also be simply and inexpensively manufactured and mounted. The connecting surface 17 of the housing 5*a* can be unmachined or needs to be machined only coarsely so that no narrow tolerances must be maintained during manufacture.

Figure 11:
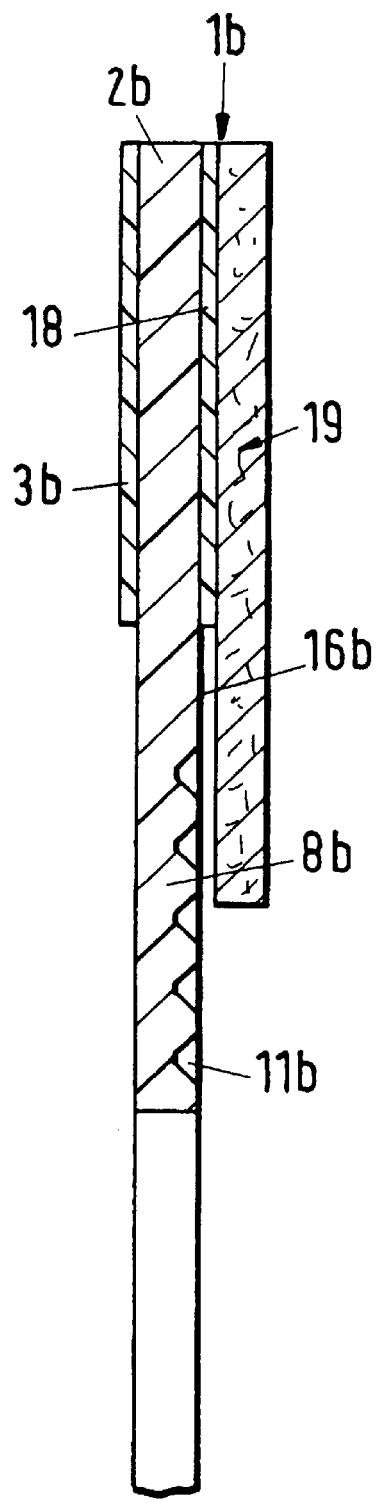
FIG. 11 shows in an illustration corresponding to FIG. 9 the embodiment of a sealing ring according to FIG. 2.

The sealing ring 1*b* according to FIGS. 3 and 11 differs from the afore described sealing ring 1*a* in that, in addition to the adhesive layer 3*b*, an additional adhesive layer 18 is provided on the air side 16*b* (FIG. 11) of the annular disk 2*b*. By means of the adhesive layer 18, a ring-shaped sealing member 19 is secured to the annular disk 2*b*. The sealing member 19 is comprised preferably of nonwoven material. In the illustrated embodiment, it is somewhat thinner than the annular disk 2*b* but significantly thicker than the adhesive layer 3*b* and 18. The sealing member 19 has the same outer diameter as the annular disk 2*b* and extends up to the area of the returning device 11*b*. As illustrated in FIG. 11, the sealing member 19 has greater radial width than the two adhesive layers 3*b*, 18 which are of the same radial width. In the mounted position (FIG. 3), the sealing member 19 rests against the shaft 9.

As illustrated in FIG. 11, the sealing member 19 extends approximately to half the radial width of the sealing part 8*b*. The sealing member 19 prevents penetration of dust and dirt particles or the like.

The mounting tool 12*b* for the sealing ring 1*b* is identical to the tool according to FIG. 2.

Figure 4:
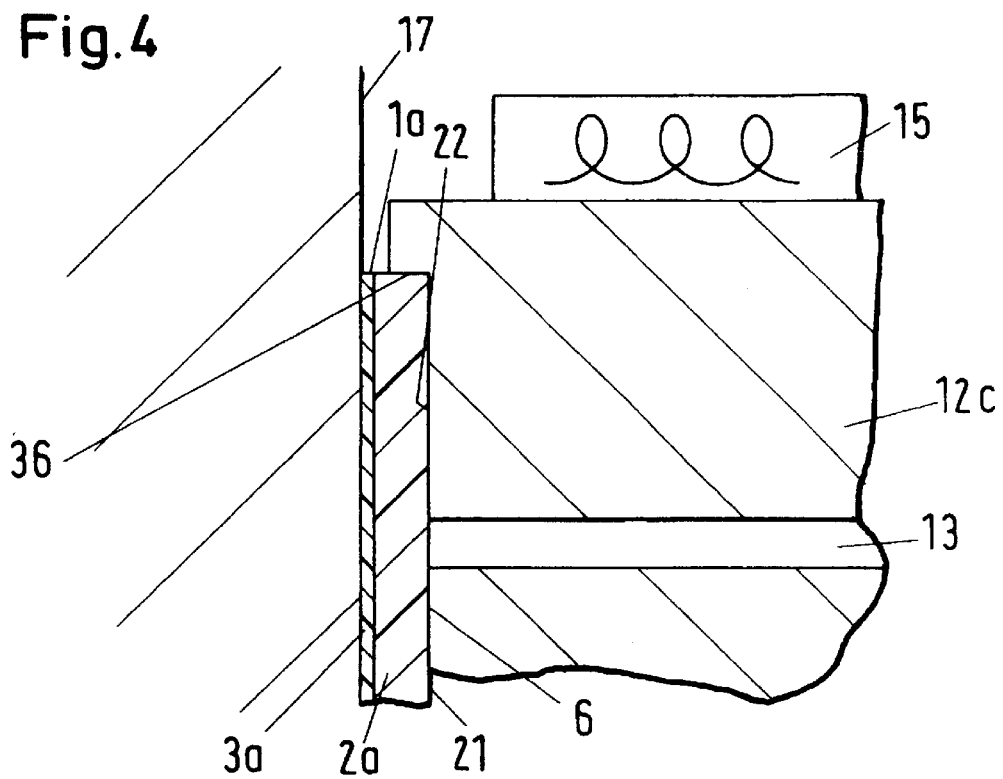
FIG. 4 shows a part of the sealing ring according to FIG. 2 arranged in a mounting tool.

FIG. 4 shows the annular disk 2*a* according to FIG. 2 which is fastened on the plane end face 17 of the housing 5*a*. For centering the sealing disk 2*a* during mounting, the mounting tool 12*c* has an end face recess 21. In the recess 21, the sealing ring 1*a* is positive-lockingly secured. The recess 21 is of such a configuration that the annular disk 2*a* with its outer edge rests against the sidewall 36 of the recess 21. The annular disk 2*a* rests with the side 16*a* located opposite the adhesive layer 3*a* against the bottom 22 of the recess 21. In order for the adhesive layer 3*a* to be attached reliably to the end face 17 of the housing 5*a*, the annular disk 2*a* projects past the recess 21. The mounting tool 12*c* has at least one, preferably several, supply lines 13 distributed about its circumference; the lines 13 are connected to a vacuum/underpressure device. During mounting, the sealing ring 1*a* arranged in the recess 21 is pulled by the underpressure (vacuum) sufficiently tightly or securely against the bottom 22 of the recess 21 so that a simple and safe attachment of the sealing ring 1*a* on the housing end face 17 is ensured. In other respects, the mounting tool 12*c* is identical to the configuration according to FIG. 1. By means of the tool 12*c*, the sealing ring 1*a* can be properly aligned and secured radially relative to the housing 5a during mounting until the adhesive layer 3a has cooled.

Figure 5:
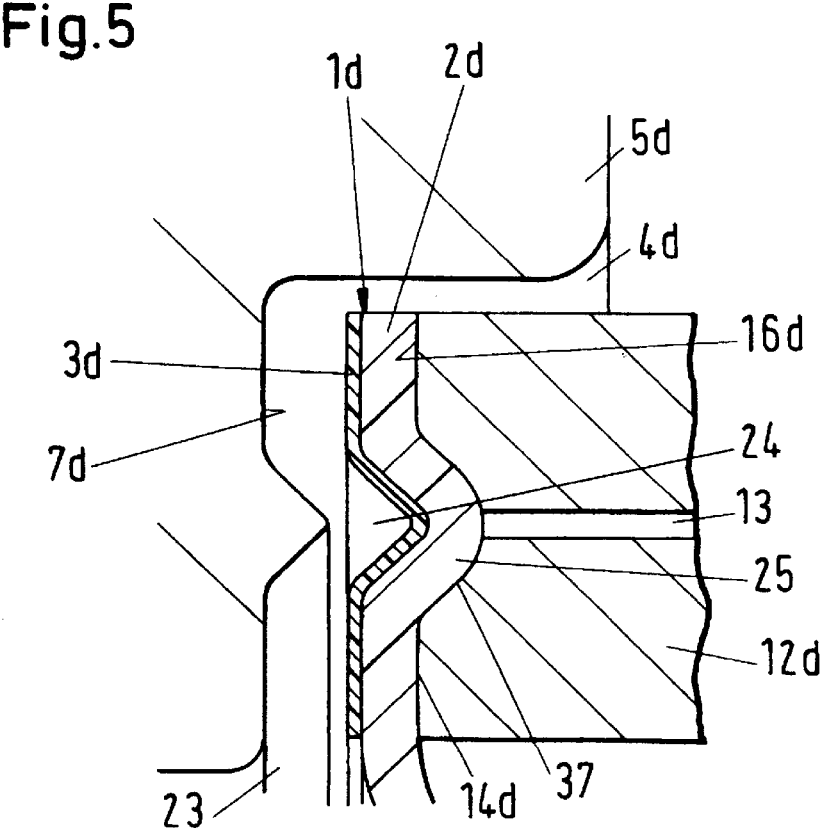
FIG. 5 shows a fourth embodiment of a sealing ring according to the invention in an illustration corresponding to FIG. 1.

In the embodiments according to FIG. 5, the bottom 7d of the receiving space 4d of the housing 5d has a nose 23 extending about the axis of the sealing ring 1d. The nose 23 has a triangular cross-section and is preferably formed as a unitary or monolithic part of the housing 5d. Advantageously, the housing 5d is cast together with the nose 23. The bottom 7d and the nose 23 can be unmachined or can be machined only coarsely. As in the preceding embodiments, fine machining with high precision is not required.

The annular disk 2d of the sealing ring 1d is provided with a depression 24 matching the nose 23; the nose 23 engages the depression 24 when the sealing ring 1d is in the mounted position. The adhesive layer 3d is matched to the shape of the annular disk 2d.

The mounting tool 12d is provided at its end face 14d with a circumferential recess 37 for receiving a bead 25 formed by the depression 24 of the sealing ring 1d. The bead 25 rests areally against the bottom of the recess 37. Supply lines 13 open into the recess 37.

The bead 25 projects past the side 16d of the annular disk 2d facing away from the adhesive layer 3d. When the annular disk 2d is comprised of polytetrafluoroethylene, the bead 25 is advantageously produced by an embossing process. The bead 25 is provided approximate at half the radial width of the fastening part 6d of the annular disk 2d.

Since the end face 14d of the mounting tool 12d is matched with regard to its shape to the annular disk 2d, the sealing ring 1d can be fastened without problems to the bottom 7d and the nose 23 of the recess 4d provided on the housing 5d.

In other respects, the mounting tool 12d is identical to the configuration of the embodiment according to FIG. 1.

Figure 6:
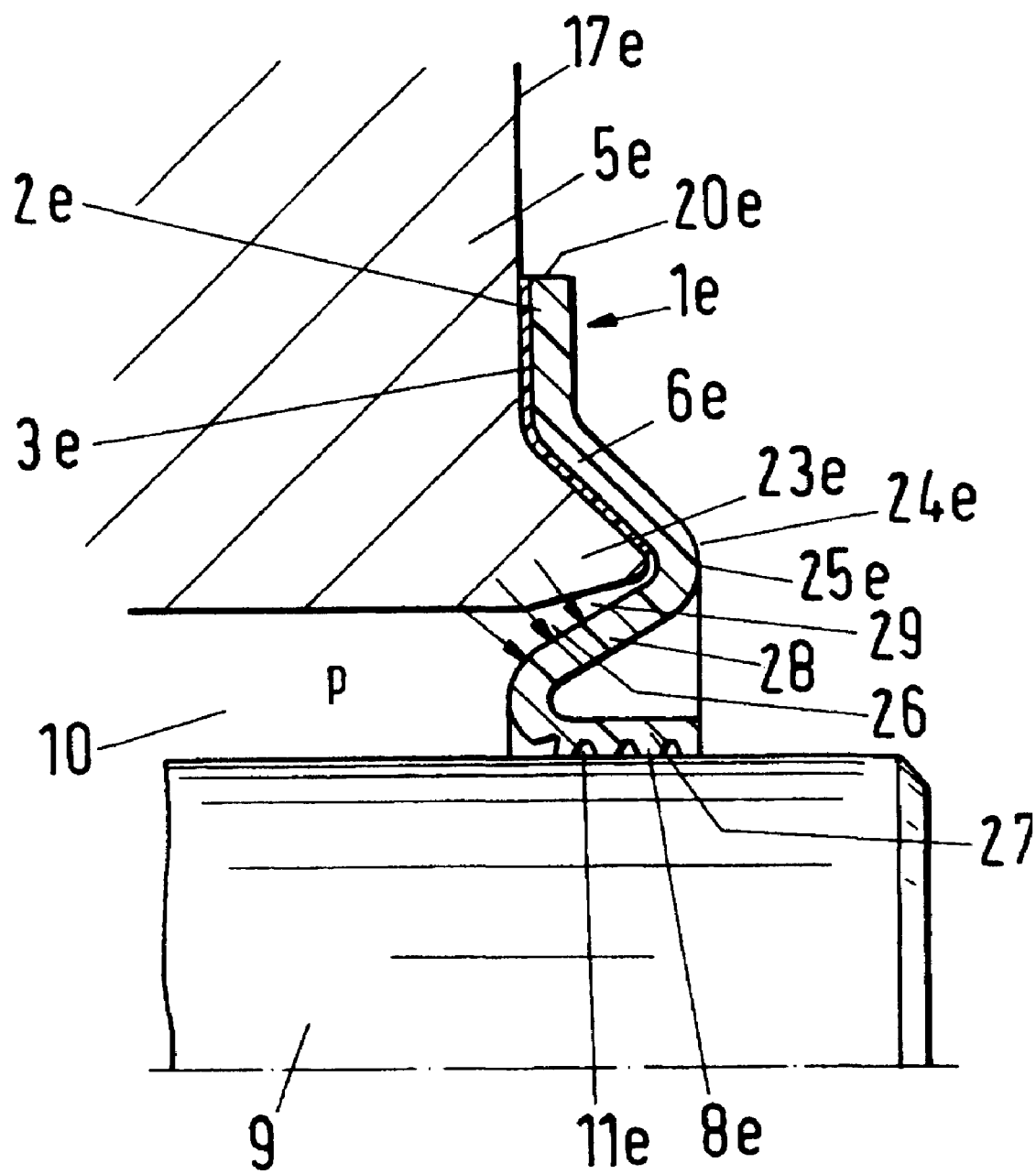
FIG. 6 shows a fifth embodiment of a sealing ring according to the invention in an illustration corresponding to that of FIG. 1.

FIG. 6 shows a sealing ring 1e fastened on the end face 17e of the housing 5e by means of the adhesive layer 3e. At the edge of the housing opening 10 for the shaft 9, a circumferentially extending projection 23e projects past the end face 17e and extends along the edge; in cross-section, the projection 23e has a triangular shape.

The annular disk 2e of the sealing ring 1e is fastened by means of the adhesive layer 3e in such a way to the end face 17 and the projection 23e of the housing 5e that the sealing part 8e rests sealingly with elastic deformation on the shaft 9. The sealing part 8e is bend to a V-shape in its mounted position when viewed in cross-section. The fastening part 6e of the sealing ring 1e has an arc-shaped transition into the sealing part 8e at the level of the tip of the projection 23e. Because of the V-shaped configuration when viewed in cross-section, the sealing part 8e rests with a sufficiently high force against the shaft 9.

The underside 26 of the projection 23e facing the shaft 9 rests against a conical surface opening in the direction toward the air side. In this way, between the underside 26 and the neighboring section 28 of the sealing part 8e, an annular gap 29 is formed that tapers from the medium side in the direction toward the section 28 of the sealing part 8e and is closed off by it relative to the air side. The section 28 adjoins at an acute angle an end section 27 extending in the direction toward the air side with which the seating parts 8e rests against the shaft 9. The end section 27 has a returning device 11e for the medium to be sealed. On the medium side, the pressure P acts on the sealing part 8e. By means of the medium present within the annular gap 29, the sealing part 8e or its section 28 is loaded in the direction toward the shaft 9, as indicated by the arrows illustrated in FIG. 6. When the medium pressure increases, the sealing part 8e is forced more strongly against the shaft 9 so that a proper sealing action is ensured and leakage is reliably prevented. Should overpressure occur, the sealing part 8e will not be lifted off the shaft 9 because of the described configuration. The section 28 of the sealing part 8e extends in the direction toward the air side radially at a slant outwardly so that it is loaded radially inwardly because of the pressure on the medium side. This has the result that the end section 27, resting sealingly on the shaft 9 and extending in the direction toward the air side, is also pressed tightly against the shaft 9. Moreover, the sealing ring is more flexible in the radial direction as a result of the described configuration.

Figure 7:
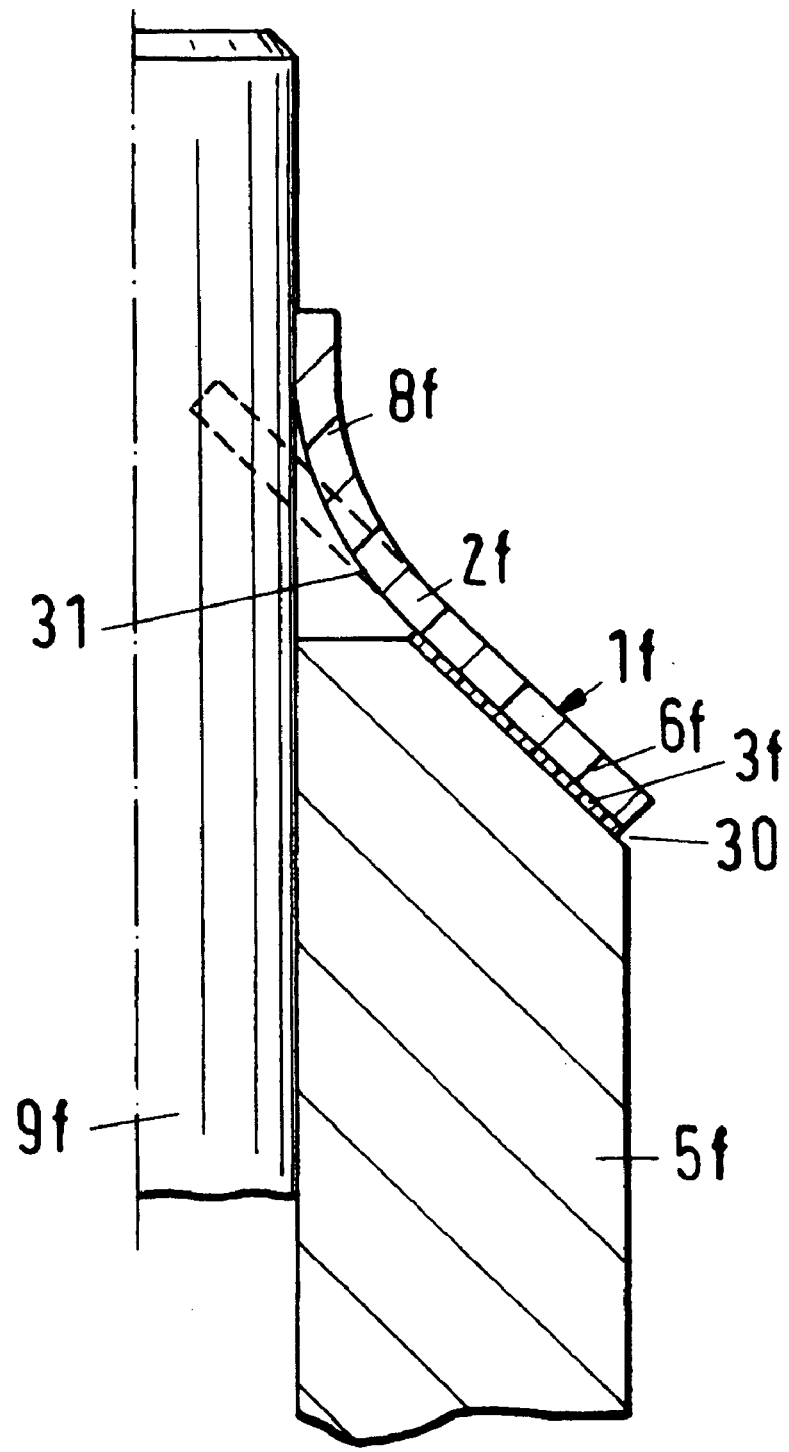
FIG. 7 shows a sixth embodiment of a sealing ring according to the invention in an illustration corresponding to that of FIG. 1.

FIG. 7 shows a rod seal 1f that is comprised, like the sealing ring 1, of an annular disk 2f and adhesive layer 3f. It extends approximately across half the radial width of the disk 2f. By means of the adhesive layer, the sealing ring 1f is attached to a conical surface 30 of a guide housing 5f for a piston rod 9f or a valve shaft. The sealing ring 1f is fastened with its fastening part 6f by means of the adhesive layer 3f on the surface 30. The sealing part 8f projecting freely forwardly past the housing 5f or the conical surface 30 rests with elastic prestress sealingly against the piston rod 9f.

In contrast to the above described sealing rings, the inner side 31 of the sealing part 8f resting against the rod 9f is smooth, i.e., without any returning device. The sealing ring 1f can also be manufactured simply and inexpensively and mounted easily. For mounting, a mounting tool (not illustrated) can be provided that is of a similar configuration as the above described mounting tools.

FIGS. 8 and 9 show the possibility of employing an adhesive layer 3 protected by a protective film 32 for attaching the sealing ring 1 to a housing. The protective film 32 has the same size as the adhesive layer 3 so that the layer 3 is completely covered. The protective film 32 is removed from the adhesive layer 3 shortly before mounting the sealing ring 1. The protective film 32 can be used in all described embodiments. Advantageously, the protective film 32 is used when the adhesive layer 3 is formed by a double-sided adhesive strip.

Figure 13:
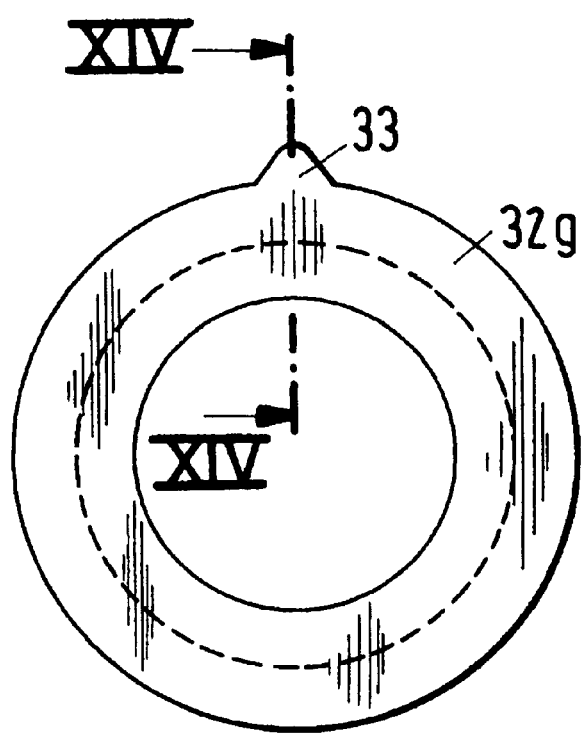
FIG. 13 shows an embodiment of a sealing ring according to FIG. 2 with a protective film in an illustration corresponding to FIG. 8.
Figure 14:
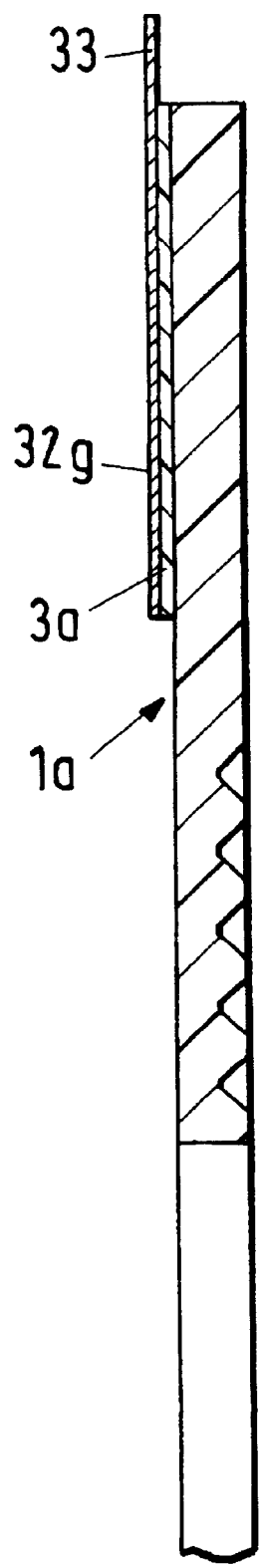
FIG. 14 shows in an enlarged illustration a section along the line XIV—XIV of FIG. 13.

In order to facilitate removal of the protective film 32, it can be provided with a radially projecting tab 33, as is illustrated with the aid of the protective film 32g in FIGS. 13 and 14. By means of the tab 33, the protective film 32g can be gripped easily in order to remove it in a simple and quick way from the adhesive layer 3a before mounting of the sealing ring 1a.

Figure 15:
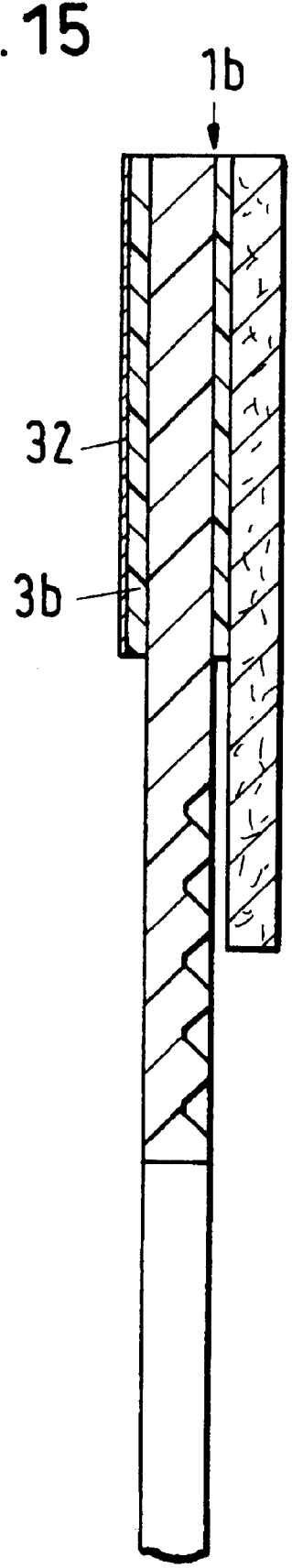
FIG. 15 shows in an illustration corresponding to FIG. 9 of the embodiment of a sealing ring according to FIG. 3 having a protective film attached thereto.

FIG. 15 shows the sealing ring 1b according to FIG. 3 and 11 where the adhesive layer 3b is a double-sided adhesive strip whose outer side is protected by a protective film 32. Of course, in place of this protective film the protective film 32g according to FIGS. 13 and 14 can be used.

FIG. 16 shows a sealing ring 1g that corresponds substantially to that of FIG. 3. Instead of the sealing member 19, a further annular disk 2g' is provided whose sealing part 8g' is bent in the same direction relative to the medium side as the sealing part 8g of the annular disk 2g. It is glued by means of the adhesive layer 3g to the housing 5g while the annular disk 2g' with its fastening part 6g' is fastened by means of an additional adhesive layer 18g' on the sealing ring 2g. The sealing ring 8g' of the annular disk 2g' is deformed also during mounting of the sealing ring 1g into the position illustrated in FIG. 16 in which position it rests with its sealing part 8g' sealingly against the shaft 9. The sealing disk 2g' can have the same configuration as the sealing disk 2g. However, it can also have a reduced wall thickness, as illustrated, but also a greater one, and can be free of any returning device. Both sealing disks 2g, 2g' can be made of the same material or different materials, for example, polyfluorocarbon, preferably polytetrafluoroethylene or elastomer-modified polytetrafluoroethylene, or an elastomer or a similar material.

This embodiment has the advantage that upon wear of the first sealing disk $2g$ the second annular disk $2g'$ ensures the necessary sealing action.

The embodiment according to FIG. 17 differs from the afore described embodiment in that the second annular disk $2h'$ is connected mirror-symmetrically to the first annular disk $2h$ by means of the adhesive layer $18h'$. Moreover, the annular disk $2h'$ is provided on its sealing part $8h'$ resting seal-tightly on the shaft 9 with a returning device $11h'$ which is identical to the returning device of the sealing part $8h$ of the annular disk $2h$. The annular disk $2h$ is connected by means of adhesive layer $3h$ on the housing $5h$. As in the case of the sealing member 19 of the embodiment according to FIG. 3, the inner diameter of the annular opening delimited by the sealing part $8h'$ is smaller than the diameter of the shaft 9. In comparison to the sealing part $8h$, the sealing part $8h'$ is bent in the opposite direction, i.e., toward the air side, and forms a dust lip that prevents penetration of the dust/dirt particles into the medium.

Figure 18:
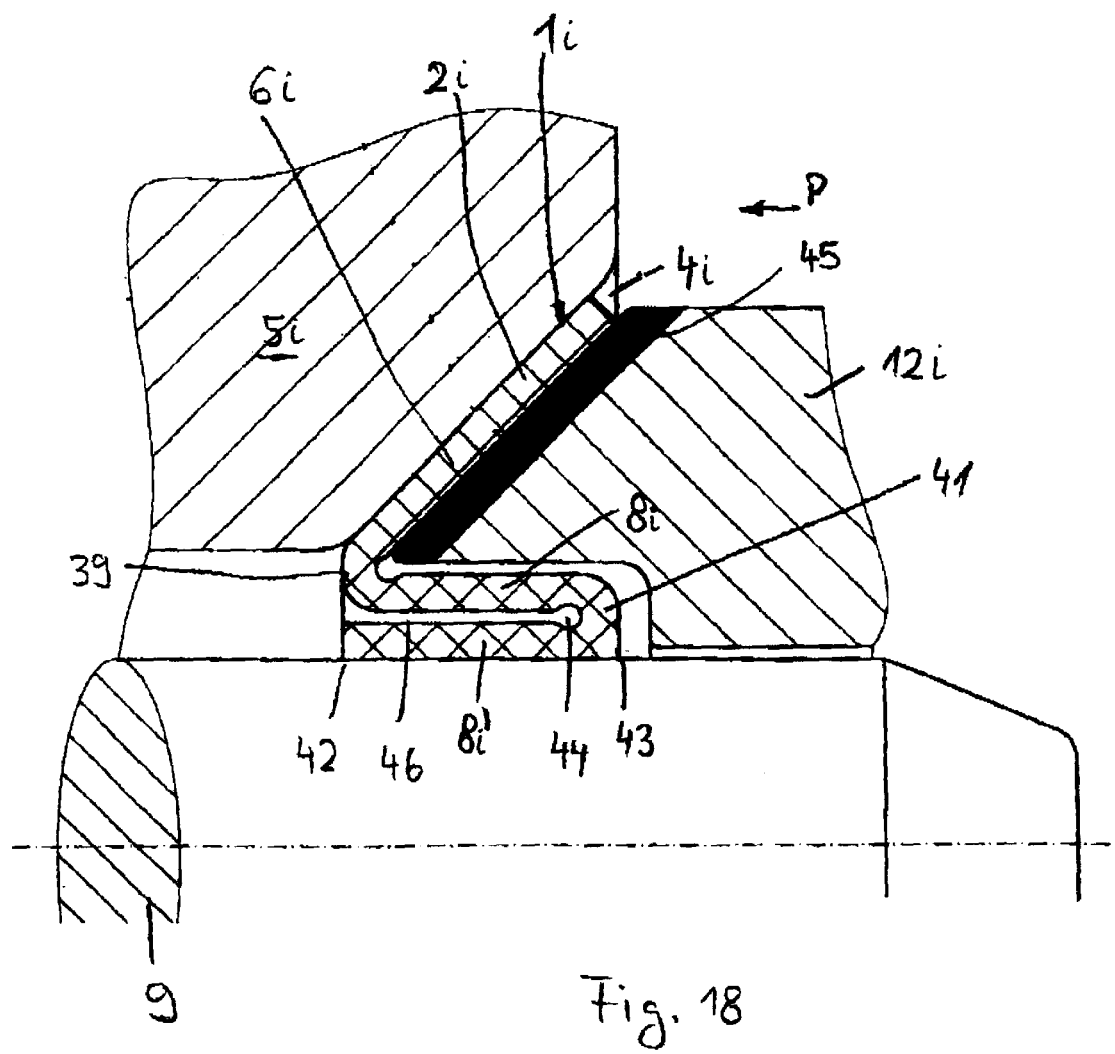
FIG. 18 shows a tenth embodiment of a sealing ring according to the invention in an illustration according to FIG. 1.

In the embodiment according to FIG. 18, the annular disk $2i$ is bent such that the fastening part $6i$ is inclined at an acute angle relative to the axially extending sealing part $8i$, $8i'$ for adaptation to a conically shaped housing receptacle $4i$. It is comprised of a first sealing lip $8i$ and a second sealing lip $8i'$ which extend substantially parallel to one another and to the shaft 9. The second seating lip $8i'$ surrounds the shaft 9. The first sealing lip $8i$ has at the medium side a transition via a circular section-shaped bent section 39 into the fastening part $6i$ and at the air side via a radially extending intermediate section 41 into the second sealing lip $8i'$. It has at the medium side and the air side primary and secondary sealing edges 42 and 43, respectively, that protect the shaft 9 relative to the medium and relative to the penetration of dirt particles from the air side. On the inner side of the intermediate section 41, a groove 44 extending coaxially to the shaft axis is provided, for example, by embossing. It acts as a joint between the sealing lips $8i$ and $8i'$ and provides a defined deflection point for the second sealing lip $8i'$. The sealing lip $8i'$ is formed by bending the straight annular disk $2i$ in a central ring section wherein the sealing lip $8i'$ is bent rollingly by 180 degrees radially outwardly to the contact position on the first sealing lip $8i$. The sealing lips $8i$ and $8i'$ in the embodiment have identical length. Of course, they can also have different lengths. The second sealing lip $8i'$ can also be provided at its contact surface with the shaft 9 with a known returning device in order to ensure optimal lubrication of the shaft 9 and of the sealing lip $8i'$ on the contact surfaces and to thus reduce friction and the sealing gap temperature between the shaft and the sealing lip. This also prevents the risk of oil coking.

Advantageously, in this configuration between the tool $12i$ and the fastening part $6i$ an elastic support 45 is provided with which shape deviations at the receiving cone $4i$ of the machine housing $5i$ can be compensated.

Between the two sealing lips $8i$, $8i'$ a gap-shaped annular space 46 is provided that is open to the oil side (medium side). In this way, the oil can reach the annular space 46 and force the sealing lip $8i'$ against the shaft 9. The described rotary shaft seal has the advantage that it can be adapted to very different operating conditions and applications. For example, it can be employed in combination with known sealing rings that have only one sealing lip facing the oil or medium side. In the sealing ring according to FIG. 18, the risk of damaging the sealing lip $8i'$ when mounting the sealing ring on the shaft 9 is eliminated. The sealing lip $8i'$ can be checked after mounting of the sealing ring with regard to correct mounting. Moreover, no additional dust lip is required because this function is already integrated by means of the secondary sealing edge 43. Moreover, the sealing ring enables a reduction of the seal size by at least 50% and a weight reduction of the device to be sealed up to several kilograms. With regard to the seal, a weight savings by 90% in comparison to known sealing rings provided with a sealing lip oriented toward the air side can be achieved.

Also, a cost reduction with regard to the sealing ring is possible in comparison to the known sealing rings. Finally, in the sealing ring according to FIG. 18 no machining of the seal receptacle is required so that the expensive and precise machining of the sealing receptacle bore is no longer required. Also, the sealing ring still has the advantages of the seals having a sealing lip oriented toward the oil side. The disadvantages of these known seals are moreover eliminated. The advantages of the above described seals relative to the known seals reside in that the position of the sealing edge relative to the air and medium sides can be selected freely. Moreover, a combination of the sealing principles 'returning action' and 'sealing edge' is possible. Also, a priority with regard to an oil sealing action or a protective action can be set. Finally, it is prevented that the sealing lip upon pressure loading will be lifted off the shaft so that a pressure check of the device is possible without additional measures and the use of the seal is possible also for pressure loading. It is also advantageous that the sealing lip can be loaded by pressure from the oil side as well as from the air side. In this way, the mounting position is universal, and the sealing ring or the seal is suitable for separating two pressure chambers.

While specific embodiments of the invention have been shown and described in detail to illustrate the inventive principles, it will be understood that the invention may be embodied otherwise without departing from such principles.

What is claimed is:

1. A sealing ring comprising:
    an annular disk comprising at least one fastening part secured on a first machine part and at least one sealing part that, when the sealing ring is mounted, sealingly rests against a second machine part;
    wherein the annular disk is fastened without intermediate positioning of a supporting body on the first machine part,
    wherein the annular disk has at least one circumferentially extending bead corresponding to a projection provided on a connecting wall of the first machine part;
    a first bonding layer attached to the annular disk, wherein the annular disk is connected with the first bonding layer to the first machine part.

2. The sealing ring according to claim 1 forming a rotary shaft seal, a piston seal ring, or a rod seal.

3. The sealing ring according to claim 1, wherein one of the first and second machine parts is stationary and the other one of the first and second machine parts is moveable.

4. The sealing ring according to claim 1, wherein the first bonding layer is an adhesive layer.

5. The sealing ring according to claim 1, wherein the first bonding layer is an adhesive film.

6. The sealing ring according to claim 1, wherein the first bonding layer is annular.

7. The sealing ring according to claim 1, wherein the at least one fastening part is an outer annular section of the annular disk.

8. The sealing ring according to claim 7, wherein the at least one sealing part is a radial inner annular section of the annular disk.

9. The sealing ring according to claim 1, wherein the bonding layer extends from a radial outer edge of the at least one fastening part up to half a radial width of the annular disk.

10. The sealing ring according to claim 1, further comprising a protective part for protecting the first bonding layer.

11. The sealing ring according to claim 10, wherein the protective part has at least one removal tab.

12. The sealing ring according to claim 1, wherein the at least one sealing part has an annular opening having an inner diameter that is smaller than a diameter of the first machine part or the second machine part received therein.

13. The sealing ring according to claim 1, wherein the annular disk is configured to be fastened by a mounting tool on the first machine part.

14. The sealing ring according to claim 13, wherein the bonding layer is meltable and wherein the mounting tool is heatable for melting the first bonding layer.

15. The sealing ring according to claim 13, wherein the annular disk is secured by suction on the mounting tool.

16. The sealing ring according to claim 13, wherein the annular disk is arranged in an end face recess of the mounting tool.

17. The sealing ring according to claim 13, further comprising an elastic support arranged between the at least one fastening part and the mounting tool for mounting the sealing ring.

18. The sealing ring according to claim 1, wherein the at least one sealing part comprises at least one returning device for the medium to be sealed.

19. The sealing ring according to claim 1, wherein the annular disk consists of a material selected from the group consisting of polyfluorocarbon, elastomer-modified polyfluorocarbon, and elastomer.

20. The sealing ring according to claim 19, wherein the polyfluorocarbon is polytetrafluoroethylene and the elastomer-modified polyfluorocarbon is elastomer-modified polytetrafluoroethylene.

21. The sealing ring according to claim 1, wherein the at least one sealing part has a first sealing lip and a second sealing lip pointing in opposite directions.

22. The sealing ring according to claim 21, wherein the first and second sealing lips rest against one another.

23. The sealing ring according to claim 21, wherein the first sealing lip faces an air side of the sealing ring and the second sealing lip faces a medium side of the sealing ring.

24. The sealing ring according to claim 21, wherein the first and second sealing lips are connected to one another by a joint.

25. The sealing ring according to claim 21, wherein the second sealing lip has at least one of a primary sealing edge and a secondary sealing edge.

26. The sealing ring according to claim 21, wherein the first and second sealing lips have at least one of an identical length and an identical thickness.

27. The sealing ring according to claim 21, wherein the second sealing lip is bent or rolled into a sealing position.

28. The sealing ring according to claim 21, wherein the first and second sealing lips delimit an annular chamber that is closed relative to an air side of the sealing ring and open relative to a medium side of the sealing ring.

29. A sealing ring comprising:
an annular disk comprising at least one fastening part secured on a first machine part and at least one sealing part that, when the sealing ring is mounted, sealingly rests against a second machine part;
wherein the annular disk is fastened without intermediate positioning of a supporting body on the first machine part;
a first bonding layer attached to the annular disk, wherein the annular disk is connected with the first bonding layer to the first machine part;
a protective film fastened to the first bonding layer for protecting the first bonding layer.

30. The sealing ring according to claim 29, wherein the protective film is glued to the first bonding layer.

31. A sealing ring comprising:
an annular disk comprising at least one fastening part secured on a first machine part and at least one sealing part that, when the sealing ring is mounted, sealingly rests against a second machine part;
wherein the annular disk is fastened without intermediate positioning of a supporting body on the first machine part;
a first bonding layer attached to the annular disk, wherein the annular disk is connected with the first bonding layer to the first machine part;
a second bonding layer, wherein the first and second bonding layers are arranged on opposed sides of the at least one fastening part.

32. The sealing ring according to claim 31, wherein the first and second bonding layers are identical.

33. The sealing ring according to claim 31, further comprising a sealing member attached to the at least one fastening part.

34. The sealing ring according to claim 33, wherein the sealing member is a ring-shaped disk.

35. A sealing ring comprising:
an annular disk comprising at least one fastening part secured on a first machine part and at least one sealing part that, when the sealing ring is mounted, sealingly rests against a second machine part;
wherein the annular disk is fastened without intermediate positioning of a supporting body on the first machine part;
a sealing member attached to the at least one fastening part.
a bonding layer, wherein the sealing member is fastened with the bonding layer to the at least one fastening part.

36. The sealing ring according to claim 35, wherein the bonding layer is an adhesive layer.

37. The sealing ring according to claim 35, wherein the sealing member consists of non-woven material.

38. The sealing ring according to claim 35, wherein the sealing member has at least one of a greater radial width and a greater thickness than the bonding layer.

39. The sealing ring according to claim 35, wherein the sealing member has an annular opening having an inner diameter that is slightly greater than a diameter of the first machine part or the second machine part received therein.

40. A sealing ring comprising:
an annular disk comprising at least one fastening part secured on a first machine
part and at least one sealing part that, when the sealing ring is mounted, sealingly rests against a second machine part;

wherein the annular disk is fastened without intermediate positioning of a supporting body on the first machine part;

wherein the annular disk consists of a material selected from the group consisting of polyfluorocarbon, elastomer-modified polyfluorocarbon, and elastomer;

wherein at least a fastening area of the annular disk is plasma-treated.

41. The sealing ring according to claim 40, wherein at least the fastening area of the annular disk is plasma-etched.

* * * * *